United States Patent
Watanabe et al.

(10) Patent No.: US 6,817,657 B2
(45) Date of Patent: Nov. 16, 2004

(54) VEHICLE BODY STRUCTURE

(75) Inventors: Shigeki Watanabe, Anjo (JP); Kenichi Okamura, Nagoya (JP); Masahiro Awano, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/409,209

(22) Filed: Apr. 9, 2003

(65) Prior Publication Data

US 2003/0189358 A1 Oct. 9, 2003

(30) Foreign Application Priority Data

Apr. 9, 2002 (JP) ........................................ 2002-106004

(51) Int. Cl.⁷ ............................................... B60R 27/00
(52) U.S. Cl. ....................... 296/203.02; 296/70; 180/90
(58) Field of Search ............................ 296/70, 193.09, 296/203.02, 203.03, 204; 180/90

(56) References Cited

U.S. PATENT DOCUMENTS 5,806,918 A * 9/1998 Kanazawa .................. 296/204
5,882,065 A * 3/1999 Koiwa et al. ........... 296/203.02
6,095,592 A * 8/2000 Nakatani ................ 296/203.02
6,398,292 B2 * 6/2002 Tsuruta et al. .............. 296/204
6,435,603 B1 * 8/2002 Ohmura et al. ......... 296/203.02
2001/0028179 A1 * 10/2001 Takemoto et al. ........... 296/204
2001/0033094 A1 * 10/2001 Sano et al. ................. 296/194

FOREIGN PATENT DOCUMENTS

JP          2-237875 A        9/1990
JP          2522690           10/1996

* cited by examiner

Primary Examiner—D. Glenn Dayoan
Assistant Examiner—Lori L. Coletta
(74) Attorney, Agent, or Firm—Birch, Stewart, Kolasch & Birch, LLP

(57) ABSTRACT

In a vehicle body structure, rear portions of right and left front side members are gently curved downward, and rear end portions of the right and left front side members are bonded to front floor side members. A dash panel is provided to separate an engine compartment and a passenger compartment of a vehicle. A cross member dash assuming a closed cross-sectional shape is fixed to a front surface of the dash panel. Opposite end portions of the cross member dash are bent toward the rear of the vehicle to constitute bent portions. Side member braces are laid between the front side members and the bent portions of the cross member dash to connect them together.

8 Claims, 5 Drawing Sheets

VEHICLE BODY STRUCTURE

The entire disclosure of Japanese Patent Application No. 2002-106004 filed on Apr. 9, 2002, including specification, claims, drawings and summary, is incorporated herein by reference in its entirety.

BACKGROUND OF THE INVENTION

1. Field of the Invention

This invention relates to a vehicle body structure which forms an engine compartment and a passenger compartment by a skeleton.

2. Description of the Related Art

FIG. 5 is a plan view of a vehicle body frame showing a conventional vehicle body structure.

In the conventional vehicle body structure, as shown in FIG. 5, right and left front side members 001 are disposed along a fore-and-aft direction in right and left side portions of a vehicle body. The right and left front side members 001 each have a closed cross-sectional shape, and have front end portions bonded together by a front bumper reinforcement 002. Rear end portions of the respective front side members 001 are curved outward, and are bonded to front end portions of right and left front side sills 003. Rear end portions of the respective front side sills 003 are bonded to a rear seat cross member 004. Right and left front floor side members 005 are disposed inwardly of the front side sills 003, and have front end portions bonded to the rear end portions of the front side members 001, and have rear end portions bonded to the rear seat cross member 004, etc. Furthermore, a dash panel 006 for separating an engine compartment and a passenger compartment is disposed between the right and left front side members 001. A cross member dash 007 of a closed cross-sectional shape is fixed to the dash panel 006, and right and left end portions of the cross member dash 007 are bonded to the front side members 001.

Thus, when a collision load is inputted to the front bumper reinforcement 002 by front collision, this input load is transmitted via the front side members 001 to the front side sills 003 and the front floor side members 005, and to the cross member dash 007, and absorbed thereby, so that the deformation of the passenger compartment can be prevented.

According to the above-described conventional vehicle body structure, the rear end portions of the front side members 001 are bonded to the front side sills 003 and the front floor side members 005, and the cross member dash 007 is disposed along the dash panel 006 disposed between the right and left front side members 001. Because of these features, the input load at the time of collision is distributed to and absorbed by the respective members, and the respective members of a closed cross-sectional shape are adapted to accommodate the load sufficiently. However, the cross member dash 007 has a closed cross-sectional shape, but its right and left end portions are bonded to the front side members 001. Thus, its strength is insufficient to prevent the deformation of the passenger compartment reliably in response to the input load.

At the time of a lapped collision, in particular, a great load is imposed on one side of the vehicle body. Thus, conventional measures taken have been to increase the plate thickness of the front side member 001, and add reinforcement members. These measures have induced increased costs and an increase in the weight of the vehicle body.

Among conventional vehicle body structures, there is the one disclosed, for example, in Japanese Unexamined Utility Model Publication No. 1992-9378. The device disclosed in this publication, entitled "A vehicle body front structure", comprises a cross member formed along a vehicle width direction so as to be curved rearward, front side members having rear portions bonded to the projection of the cross member, and front pillars having end portions of the cross member bonded thereto. In this "vehicle body front structure", however, the cross member is formed in a curved shape, and as in the aforementioned conventional vehicle body structure, deformation is inhibited merely by the rigidity of the cross member itself in response to input load. The "vehicle body front structure", having this feature, is insufficient in strength for preventing the deformation of the passenger compartment.

SUMMARY OF THE INVENTION

The present invention has been accomplished in an attempt to solve the problems with the earlier technologies. Its object is to provide a vehicle body structure designed to increase safety by imparting sufficient strength to a skeletal portion of a vehicle compartment, without inducing an increase in cost and an increase in the weight of a vehicle body.

A vehicle body structure according to the present invention, designed to attain the above object, comprises: a dash panel member provided to separate an engine compartment and a passenger compartment of a vehicle, the dash panel member taking a nearly flat shape in a middle portion thereof, and bending and extending to the rear of the vehicle from opposite side portions of the middle portion; a cross member extending in a vehicle width direction along the dash panel member and assuming a closed cross-sectional shape in cooperation with the dash panel member; and side members disposed in side portions of the engine compartment, extending from the front side of the vehicle toward bent portions of the cross member for connection to the bent portions, and extending below a floor panel of the vehicle.

Thus, a load inputted to the side members by collision in the fore-and-aft direction of the vehicle is inputted to the bent portions of the cross member, and is transmitted from the bent portions in such a manner as to be distributed in the longitudinal direction of the cross member. This input load is thus absorbed and supported by the cross member, so that the deformation of the passenger compartment can be prevented reliably.

In the vehicle body structure, the cross member may be fixed to a front surface of the dash panel member, and may be composed of a straight-line portion located in a middle area, the bent portions, and inclined portions extending rearward in a straight line from the bent portions. Thus, the load inputted to the bent portions of the cross member is transmitted from the bent portions in such a manner as to be distributed to the straight-line portion and the bent portions. Consequently, this input load can be absorbed efficiently.

In the vehicle body structure, brace members may be laid between, and connected to, the side members and the bent portions of the cross member. Thus, the use of the brace members obviates the need to manufacture the side member in a complicated shape, so that the machining cost can be reduced. Besides, the brace member is provided in various sizes and shapes, whereby collision characteristics suitable for various vehicle classes can be exhibited.

In the vehicle body structure, the side member may have a rear portion gently curved downward and extending rearward, and the side member and the brace member may together take a nearly straight-line form and the brace member may be connected to the bent portion of the cross member. Thus, the collision load is properly transmitted from the side members to the cross member via the brace members. Consequently, this input load can be absorbed efficiently.

In the vehicle body structure, floor side members may be disposed inwardly of side sills disposed in side portions of the passenger compartment, and the side members may have rear portions gently curved downward and may have rear end portions bonded to the floor side members. Thus, the collision load is transmitted from the side members to the cross member, and is also transmitted to the side sills and the floor side members. Consequently, this input load can be absorbed efficiently.

In the vehicle body structure, opposite side portions of the cross member may extend in the longitudinal direction of front pillars of the vehicle. Thus, the load inputted to the cross member is transmitted in the extending direction of the front pillars, so that this input load can be efficiently absorbed by the front pillars.

In the vehicle body structure, the cross member may have inclined portions extending rearward in a straight line from the bent portions so as to be inclined upwardly, and rear end portions of the inclined portions may be bonded to the front pillars. Thus, the inclined portions of the cross member can be easily located adjoining the front pillars, so that the collision load inputted to the cross member can be efficiently absorbed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PRESENT INVENTION

Embodiments of the present invention will now be described in detail with reference to the accompanying drawings, which in no way limit the invention.

Figure 1:
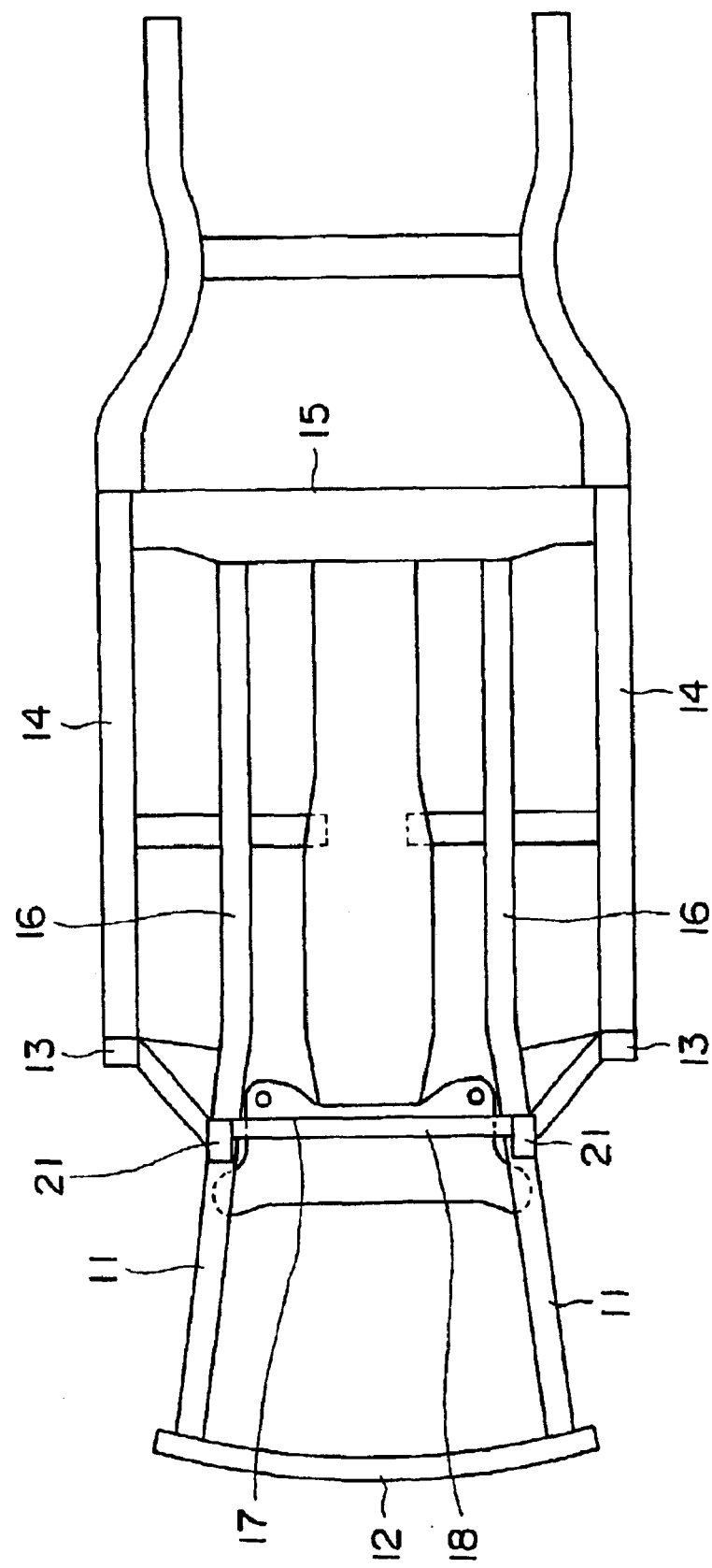
FIG. 1 is a plan view of a vehicle body frame showing a vehicle body structure according to an embodiment of the present invention.
Figure 2:
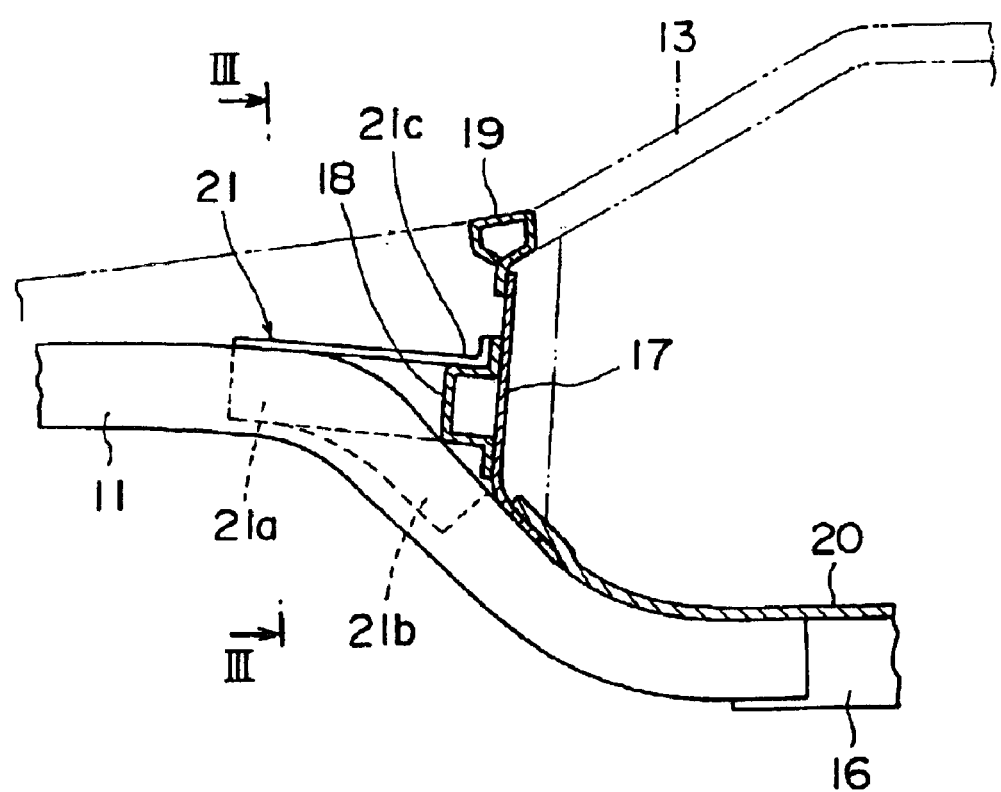
FIG. 2 is a side view showing a structure for connecting a front side member to a cross member dash.
Figure 3:
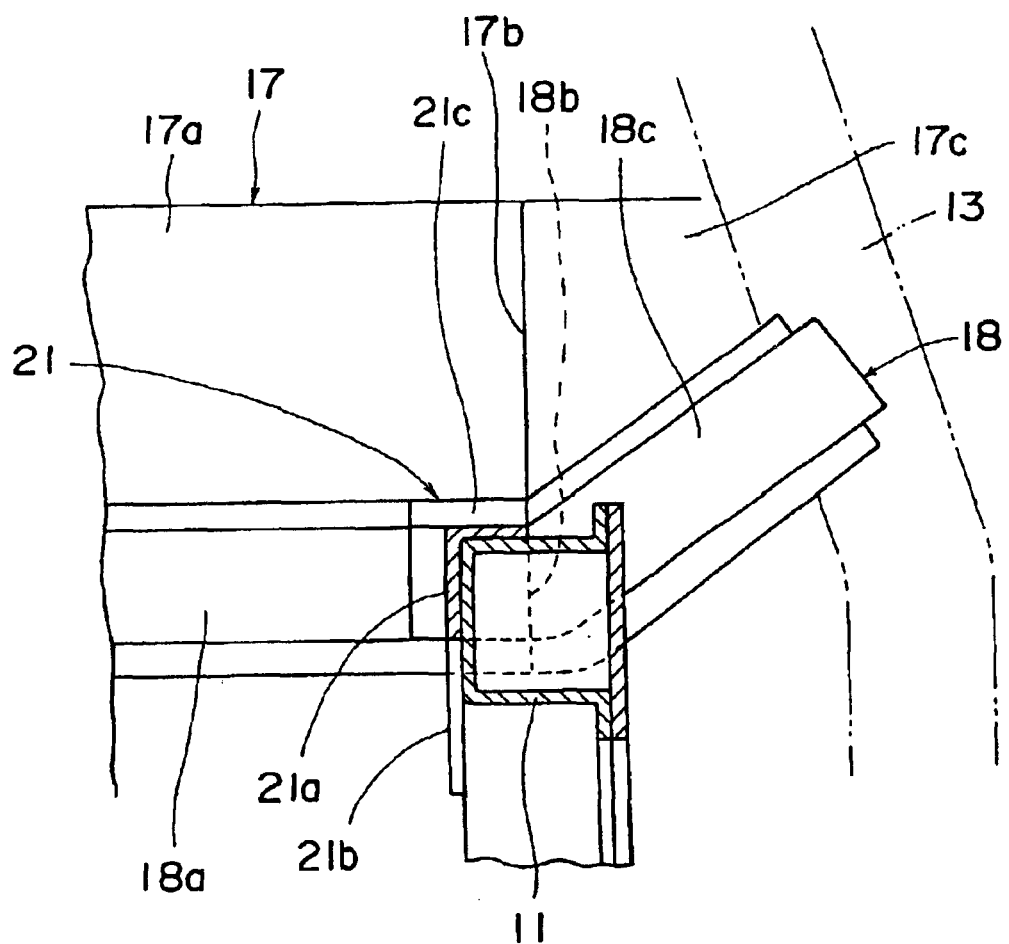
FIG. 3 is a sectional view taken on line III—III of FIG. 2.
Figure 4:
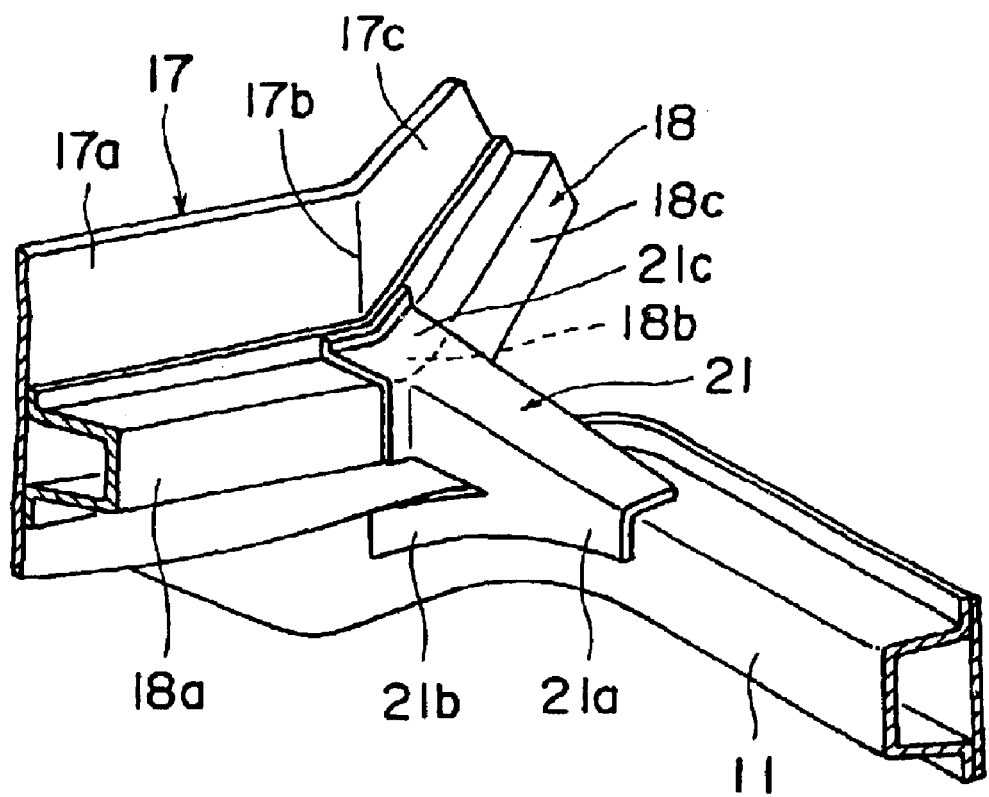
FIG. 4 is a schematic view showing a structure for connecting the front side member to the cross member dash.
Figure 5:
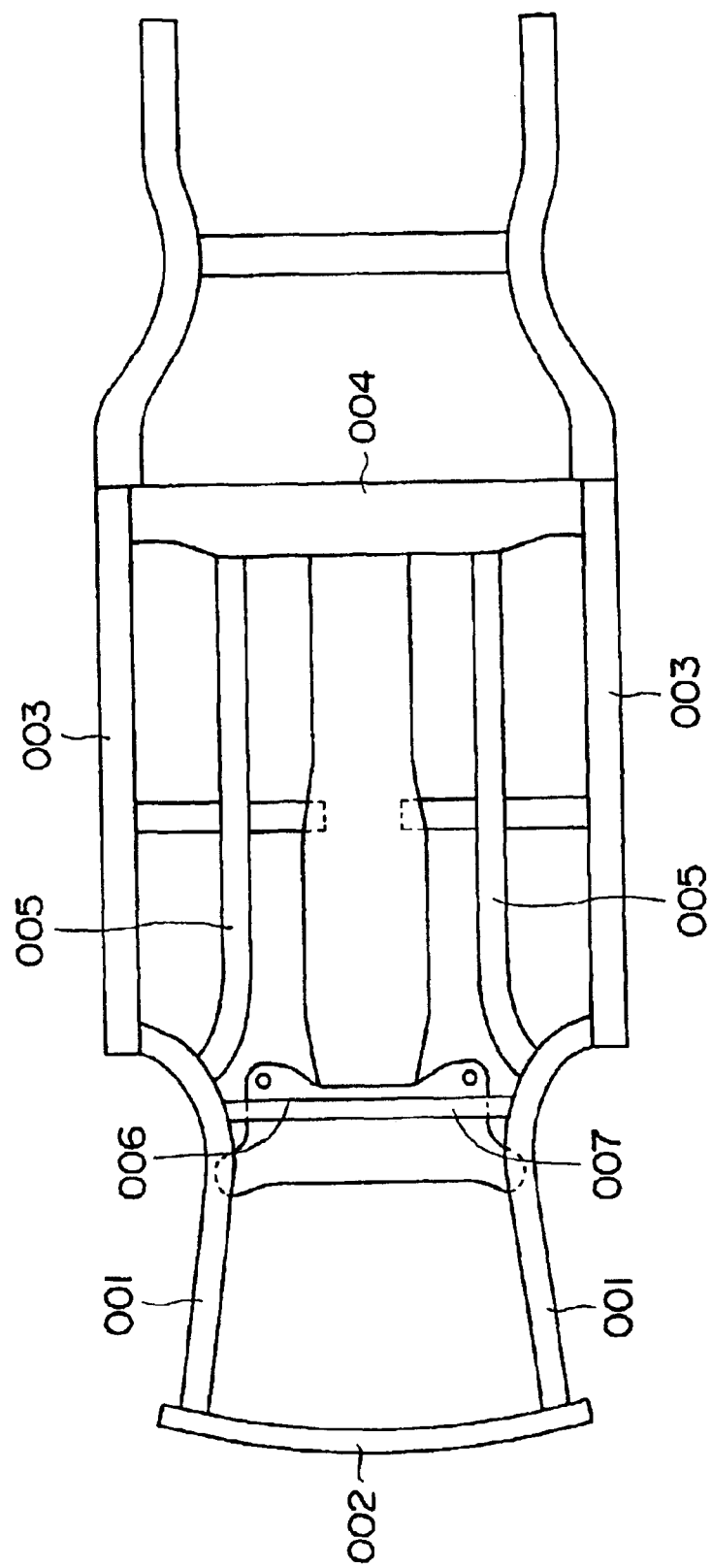
FIG. 5 is a plan view of a vehicle body frame showing a conventional vehicle body structure.

In a vehicle body structure according to the present embodiment, as shown in FIGS. 1 to 4, right and left front side members (side members) 11, as a pair, each take a closed cross-sectional shape formed by two members bonded together by welding. The front side members 11 are disposed along a fore-and-aft direction in side portions of a vehicle body, and have front end portions bonded together by a front bumper reinforcement 12. Each of the front side members 11 has a rear portion curved gently downwardly, and has a rear end portion bonded to a front floor side member 16. Rear end portions of front side sills 14 are bonded to a rear seat cross member 15. The right and left front floor side members 16, each having a U-shaped cross section, are disposed inwardly of the front side sills 14, and front end portions of the front floor side member 16 are bonded to the front side members 11, while rear end portions of the front floor side members 16 are bonded to the rear seat cross member 15.

Between the right and left front side members 11, a dash panel (dash panel member) 17 is provided to separate an engine compartment and a passenger compartment of a vehicle. The dash panel 17 is composed of a flat portion 17a located in a middle area and having a nearly flat shape, bent portions 17b bending to the rear of the vehicle from both side portions of the flat portion 17a, and inclined portions 17c extending rearward from the bent portions 17b, the inclined portions 17c being bonded to front pillars 13.

A cross member dash (cross member) 18 as fixed to the front surface of the dash panel 17, the cross member dash 18 having a closed cross-sectional shape and extending in a vehicle width direction along the dash panel 17. The cross member dash 18, like the dash panel 17, is composed of a straight-line portion 18a located in a middle area and fixed to the flat portion 17a, bent portions 18b bending to the rear of the vehicle from both side portions of the straight-line portion 18a and fixed to the bent portions 17b, and inclined portions 18c extending rearward from the bent portions 18b. The inclined portion 18c is also inclined upwardly in a direction, which becomes parallel to the front pillar 13, and is bonded to the front pillar 13 along the longitudinal direction of the front pillar 13.

An upper end portion of the dash panel 17 is bonded to a cowl top 19, and a lower end portion of the dash panel 17 is bonded to a floor panel 20.

A side member brace (brace member) 21 is laid between the front side member 11 and the bent portion 18b of the cross member dash 18 to connect them. The side member brace 21 has an L-shaped cross section and a bifurcated longitudinal section. The side member brace 21 is composed of a first bond portion 21a bonded to a corner portion of the front side member 11, a second bond portion 21b bonded to a side surface of the front side member 11, and a third bond portion 21c bonded to the bend bent portion 18b of the cross member dash 18. The front side member 11 and the side member brace 21 are bonded so as to be brought on a nearly straight line into contact with the cross member dash 18.

In the vehicle body structure of the present embodiment, as described above, the rear portions of the right and left front side members 11 are curved gently downward, and their rear end portions are bonded to the front floor side members 16. The dash panel 17 is provided to separate the engine compartment and the passenger compartment of the vehicle. The cross member dash 18 having a closed cross-sectional shape is fixed to the front surface of the dash panel 17. The opposite end portions of the cross member dash 18 are bent (at the bent portions 18b) toward the rear of the vehicle. The side member brace 21 is laid between each of the front side members 11 and each of the bent portions 18b of the cross member dash 18 to connect them.

Thus, when a collision load is inputted to the front side members 11 by front collision of the vehicle, this load is transmitted from the front side members 11 to the bent portions 18b of the cross member dash 18 via the side member braces 21, and is also transmitted to the front side sills 14 and the front floor side members 16 in a distributed manner. At this time, the load transmitted to the bent portion 18b of the cross member dash 18 is distributed from the bent portion 18b to the straight-line portion 18a and the inclined portion 18c, and is further transmitted in the longitudinal direction of each of the straight-line portion 18a and the inclined portion 18c. By absorbing this input load reliably, the deformation of the passenger compartment can be prevented.

Moreover, the side member brace 21 is laid between the front side member 11 and the bent portion 18b of the cross member dash 18. The front side member 11 and the side member brace 21 are disposed in a nearly straight line, and in this state, the side member brace 21 is bonded to the bent portion 18b of the cross member dash 18. Thus, the collision load is properly transmitted from the front side members 11 to the cross member dash 18 via the side member braces 21, and the load can be accommodated efficiently. Furthermore, there is no need to form in the front side member 11 a portion for connection to the cross member dash 18, so that the structure of the front side member 11 can be simplified and the machining cost can be reduced. Besides, the size or shape of the side member brace 21 may be changed according to the model of the vehicle, whereby the strength of the vehicle body structure can be adjusted, and collision characteristics suitable for various vehicle classes can be exhibited.

In addition, the inclined portion 18c of the cross member dash 18 is provided so as to be inclined upwardly from the front side of the vehicle toward the rear side of the vehicle, and is bonded to the inclined portion 17c so as to extend in the longitudinal direction of the front pillar 13. Hence, the load transmitted to the bent portion 18b of the cross member dash 18 can be transmitted in the longitudinal direction of the front pillar 13 and absorbed efficiently. This obviates the need to provide a reinforcing member separately, so that the machining cost can be reduced and an increase in weight can be prevented.

Additionally, the cross member dash 18 is disposed only on the front surface of the dash panel 17, whereby a waterproof seal between the cross member dash 18 and the dash panel 17 can be omitted to cut down on the cost.

While the present invention has been described by the embodiments, it is to be understood that the invention is not limited thereby, but may be varied and modified in many other ways. Such variations and modifications are not to be regarded as a departure from the spirit and scope of the invention, and all such variations and modifications as would be obvious to one skilled in the art are intended to be included within the scope of the appended claims.

What is claimed is:

1. A vehicle body structure, comprising:
   a dash panel member that separates an engine compartment and a passenger compartment of a vehicle, said dash panel member having a nearly flat portion in a middle portion thereof extending in a width direction of the vehicle, and first inclined portions extending toward a rear of the vehicle from opposite side portions of the nearly flat portion;
   a cross member extending in the vehicle width direction while assuming a closed cross-sectional shape in cooperation with said dash panel member, said cross member having a straight-line portion extending along the nearly flat portion, second inclined portions extending along the first inclined portions, and bent portions formed between the straight-line portion and the second inclined portions; and
   side members disposed in side portions of said engine compartment, extending from a front side of the vehicle toward the bent portions of said cross member for connection to said bent portions, and extending below a floor panel of said vehicle.

2. The vehicle body structure according to claim 1, wherein said cross member is fixed to a front surface of said dash panel member.

3. The vehicle body structure according to claim 1, further comprising:
   brace members laid between, and connected to, said side members and the bent portions of said cross member.

4. The vehicle body structure according to claim 3, wherein said side member has a rear portion gently curved downward and extending rearward, and said side member and said brace member together forms a nearly straight-line and said brace member is connected to the bent portion of said cross member.

5. The vehicle body structure according to claim 3, further comprising:
   floor side members disposed inwardly of side sills disposed in side portions of the passenger compartment, and said side members have rear portions gently curved downward and have rear end portions bonded to said floor side members.

6. The vehicle body structure according to claim 1, wherein the second inclined portions of said cross member extends in a longitudinal direction of front pillars of said vehicle.

7. The vehicle body structure according to claim 6, wherein the second inclined portions extend rearward in a straight line from the bent portions so as to be inclined upwardly, and rear end portions of the second inclined portions are bonded to the front pillars.

8. The vehicle body structure according to claim 1, further comprising:
   brace members provided between said side members and the bent portions of said cross member, said brace members each having a first bond portion attached to a side member at a position in front of said dash panel, a second bond portion attached to the side member at a position below said dash panel, and a third bond portion attached to the cross member at a position in the vicinity of a bent portion.

* * * * *